United States Patent
Van Oorschot

(10) Patent No.: US 6,370,249 B1
(45) Date of Patent: *Apr. 9, 2002

(54) METHOD AND APPARATUS FOR PUBLIC KEY MANAGEMENT

(75) Inventor: Paul C. Van Oorschot, Ottawa (CA)

(73) Assignee: Entrust Technologies, Ltd., Ottawa (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/901,054

(22) Filed: Jul. 25, 1997

(51) Int. Cl.$^7$ ................................................. H04L 9/00
(52) U.S. Cl. ........................ 380/277; 380/259; 380/278; 380/281; 380/282; 380/283; 380/280; 713/156; 713/157
(58) Field of Search .............................. 380/21, 23, 30, 380/277, 278, 259, 281, 282, 283, 284; 713/156, 157

(56) References Cited

U.S. PATENT DOCUMENTS

| | | | | |
|---|---|---|---|---|
| 4,888,801 A | * | 12/1989 | Foster et al. ................... | 380/21 |
| 5,214,702 A | * | 5/1993 | Fischer ......................... | 380/30 |
| 5,420,927 A | * | 5/1995 | Micali .......................... | 380/23 |
| 5,717,759 A | * | 2/1998 | Micali .......................... | 380/25 |
| 5,737,419 A | * | 4/1998 | Ganesan ...................... | 380/21 |
| 5,852,665 A | * | 12/1998 | Gressel et al. ................. | 380/30 |
| 5,872,849 A | * | 2/1999 | Sudia ........................... | 380/49 |
| 5,926,548 A | * | 7/1999 | Okamoto ...................... | 380/24 |

* cited by examiner

Primary Examiner—Albert Decady
Assistant Examiner—Paul E. Callahan
(74) Attorney, Agent, or Firm—Vedder, Price, Kaufman & Kammholz

(57) ABSTRACT

A method and apparatus for public key management is accomplished when an associated authority provides, from time to time, a public key of at least one of a plurality of certificate authorities to a client. The associated authority provides the public key in a trustworthy manner over an on-line communication path and/or a store and forward communication path, which may be done using a self-signed signature public key certificate. Upon receiving the public key, the client maintains it in a storage medium associated with a client cryptographic engine. When a client application needs a security-related operation to be performed, it evokes the client cryptographic engine via an application program interface. Upon being evoked the client cryptographic engine determines whether a public key certificate associated with the security-related operation is verified as authentic based on the public key of at least one of the plurality of certification authorities. This is done by verifying the signature of the certification authority that signed the public key certificate associated with the security related operation. Once the signature is verified, the contents of the public key certificate can be authenticated. When the public key certificate is authenticated, the client cryptographic engine performs the security-related operation using a subject public key of the public key certificate associated with the security-related operation. Having done so, the client cryptographic engine provides an indication to the client application that it has successfully performed the security-related operation. If, however, the public key certificate was not authenticated, the client cryptographic engine provides the client application an indication that the security-related operation was not successfully performed.

37 Claims, 5 Drawing Sheets

METHOD AND APPARATUS FOR PUBLIC KEY MANAGEMENT

TECHNICAL FIELD OF THE INVENTION

The present invention relates generally to encryption and more particularly to public key management within a secure communication system.

BACKGROUND OF THE INVENTION

As is known, to securely transmit data from one party to another in a secure communication system, the data is encrypted using an encryption key and an encryption algorithm. Such an encryption algorithm may be a symmetric-key algorithm such as the Data Encryption Standard (DES) while the encryption key is a corresponding symmetric key. A secure transmission begins when a sending party encrypts the data using the symmetric-key algorithm. Once the data is encrypted, it is transmitted to the receiving party over a transmission medium (i.e., Internet, telephone line, Local Area Network, Wide Area Network, Ethernet™). Upon receipt, the receiving party decrypts the data using the same symmetric key, which must be transmitted to it or derived by it by some appropriately secure mechanism.

Encrypting data using public-key algorithms is somewhat more expensive than using a symmetric algorithm, but, with the symmetric algorithm, it is difficult to securely provide the symmetric key to both parties. Thus, to obtain the cost saving benefits of symmetric key encryption and the key distribution advantages of public/private key pairs, a wrapped session key is provided to the receiving party along with the data that is encrypted using the symmetric key. The wrapped session key is the symmetric key that has been encrypted using the public key (of a public/private key pair) of the receiving party. When the receiving party receives the encrypted message, it decrypts the wrapped session key using its private key to recapture the symmetric key. Having recaptured the symmetric key, it utilizes it to decrypt the message. Typically, symmetric keys are used for a relatively short duration (E.g. a communication, a set number of communications, an hour, a day, a few days), while encryption public keys are used for longer durations (E.g. a week, a month, or a year or more).

To further enhance security of encrypted data transmissions in the secure communication system, the sending party provides its signature with encrypted messages that it transmits. The signature of the sending party consists of a tag computed as a function of both the data being signed and the signature private key of the sender. The receiving party, using the corresponding signature verification public key of the sending party, can validate the signature. To ensure that the receiving party is using an authentic signature verification public key of the sending party, it obtains a signature public key certificate from a directory or a certification authority. The signature public key certificate includes the public key of the sending party and a signature of a certificate authority. The signature of the certification authority is first verified by the receiving party using a trusted public key of the certification authority that the receiving party has stored. Once the signature of the certification authority is verified, the receiving party can trust any message that was signed by the certification authority. Thus, the signature public key certificate that the receiving party obtained is verified and the signature public key of the sending party can be trusted to verify the signature of the sending party on the message.

In the above described security transmission, a critical factor to ensuring secure transmissions is providing the parties with trusted signature public keys of certification authorities. Without this, a party cannot validate a public key within a public key certificate, thus the party cannot trust the security of the message. One method to securely provide parties (i.e., clients) of the secure communication system with trusted public keys of certification authorities is to hard code the keys into the client software or pre-configure the software with the trusted public keys at the software manufacturer prior to distribution of the software.

While this provides a secure manner in which the clients obtain the signature public keys of the certification authorities, it does not provide a mechanism for easily changing a client's trusted public keys. In other words, a certification authority cannot modify a client's or a group of clients' trusted public keys on-line. An end-user, however, may modify which public keys it's client software will trust. For example, in one of its browser products Netscape™ provides a client with up to eighteen (18) public keys of certification authorities. The client may utilize these eighteen (18) certification authorities or the end-user may manually delete a subset of them if desired. In many secure communications systems, system administrators do not want end-users to alter which certification authorities their client software can trust. Further in many secure communication systems, it is desirable to provide on-line updating, and/or customized initialization of trusted certification authority public keys to clients, under the control of some organization other than the manufacturer of the client software product.

Another method for providing a single trusted certification authority public key to a client is to have the certification authority associated with the client to provide the trusted public key to the client on-line. While this method over comes the hard coding limitations described above, it does not provide the flexibility of providing more than one trusted public key to a client. This limitation restricts the client to secure communications with other clients that have the same initially trusted certification authority public key. If a client attempts to communicate with a client having a different trusted public key, the communication cannot be trusted unless the certification authorities associated with the trusted public keys have a trusted path between them. If so, a certification authority chain is established thereby allowing a client to trust a communication having a different trusted public key. As one could imagine, if the certification authority chain becomes relatively long, the efficiency of the secure communication system may suffer, or the complexity of verifying the validity of the chain itself becomes burdensome.

Therefore, a need exists for a method and apparatus for public key management that allows a client to obtain multiple trusted public keys of various certificate authorities on-line, where the ability to change a client's trusted public keys is a privilege granted by the system (rather than the end-user) and the efficiency of the secure communication system does not suffer.

DETAILED DESCRIPTION OF A PREFERRED EMBODIMENT

Generally, the present invention provides a method and apparatus for public key management. This is accomplished when an associated authority (E.g., a policy authority, a certificate certification authority and/or a system administrator) provides, from time to time, a public key of at least one of a plurality of certificate authorities to a client. The associated authority provides the public key in a trustworthy manner over an on-line communication path and/or a store and forward communication path, which may be done using a message which includes a self-signed signature public key certificate. Upon receiving the trustworthy public key, the client maintains it in a storage medium associated with a client cryptographic engine. When a client application (E.g., a word processing application, an encryption application, e-mail, html document application, drawing application, or any other type of personal computer software applications) needs a security-related operation (i.e., verification of a signature, and/or retrieval of an authentic public key of another client) to be performed, it evokes the client cryptographic engine.

Upon being evoked, the client cryptographic engine determines whether a public key certificate associated with the security-related operation is verified as authentic based on the public key of at least one of the plurality of certification authorities. This is done by verifying the signature of the certification authority that signed the public key certificate associated with the security related operation. Once the signature is verified, the contents of the public key certificate can be authenticated. When the public key certificate is authenticated, the client cryptographic engine performs the security-related operation using a subject public key of the public key certificate associated with the security-related operation. Having done so, the client cryptographic engine provides an indication to the client application that it has successfully performed the security-related operation. If, however, the public key certificate was not authenticated, the client cryptographic engine provides the client application an indication that the security-related operation was not successfully performed. With such a method and apparatus, public key management of certification authority public keys may be done on-line at initiation, during client key updates, and/or at the time of client key recovery operations, without the client's software having to be hard-coded or pre-configured with the public keys of appropriate certificate certification authorities, and without the end-user running the client having control as to which certification authorities it can and cannot trust unless such a privilege is granted by the system.

Figure 1:
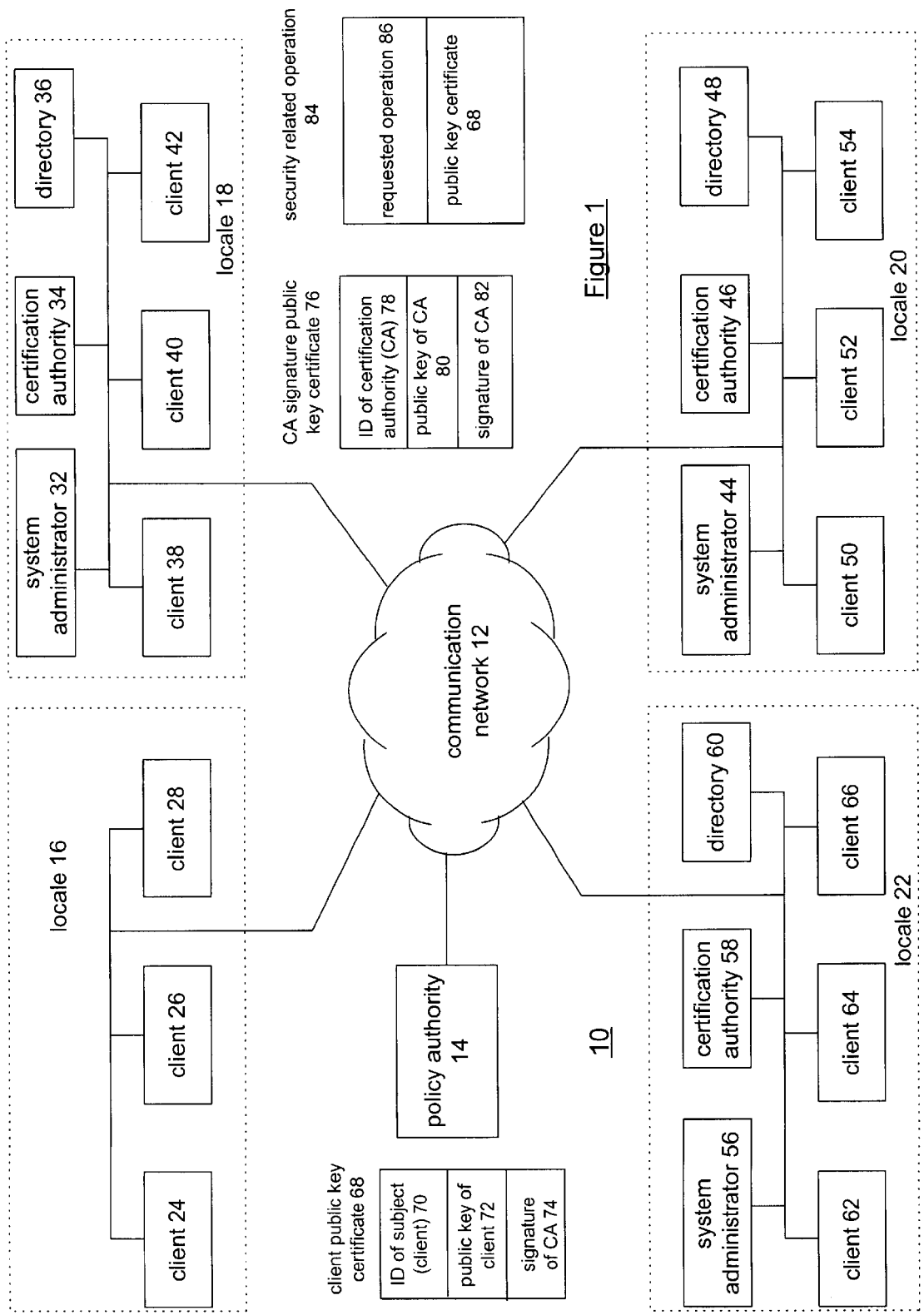
FIG. 1 illustrates a schematic block diagram of a secure communication system in accordance with the present invention.

The present invention can be more fully-described with reference to FIGS. 1 through 6. FIG. 1 illustrates a schematic block diagram of a secure communication system 10 which includes a communication network 12 and a plurality of locales 16, 18, 20 and 22. The secure communication system 10 may further include a policy authority 14 which may be a stand-alone computing device such as a personal computer, work station, or mainframe computer, that coordinates the certification authorities as to which clients they will provide trusted public key information and which certification authorities that clients will trust. As such, the policy authority 14 provides certification authority administrative functions for the secure communication system 10. As an alternative to the policy authority 14 being a stand-alone computing device, the functionality of the policy authority 14 may be performed by one, or more, of the certification authorities.

Each of the locales 16–22 are shown to include a plurality of clients 24–28, 38–42, 50–54, and 62–66. In locale 16, a system administrator 30 is operably coupled to the plurality of clients 24–28. For the purposes of this discussion, a client is a processing device such as a personal computer, work station, or any other device which manipulates digital information based on programming instructions and provides its user with input and output interfaces. Each of the clients include cryptographic software that utilizes public/private key pairs and signature public key certificates of certification authorities such that the authentication of public-key certificates of end-users' clients may be verified. One such encryption software is Entrust/Client Software that is manufactured and distributed by Entrust Technologies Limited.

The system administrator 32 provides system administrative functions for the clients 38–42. Such system administrative functions may be establishing e-mail accounts, encryption accounts, establishing security levels, access to particular data files, etc. In addition, the system administrator 32 communicates with certification authority 34 of locale 18 as to which certification authorities clients 38–42 may trust. For example, the system administrator may provide that clients 38–42 may only trust certification authority 58.

Locales 18, 20 and 22 are each shown to include the plurality of clients 38–42, 50–54, and 62–66, a system administrator 32, 44, and 56, a certification authority 34, 46, and 58, and a directory 36, 48, and 60. The directories 36, 48, and 60 store public key certificates for some or all of the clients in the entire system, wherein the public key certificates are signed by a certification authority. Thus, when a client desires to transmit a message to another client at the same locale, it accesses the directory 36, 48, or 60 to retrieve the public key certificate of the desired recipient client. Note that the transmitting client, once it has obtained the public key certificate of another client, may store it locally, such that, for future communications with the recipient client, the transmitting client does not need to access the directory.

Once the public key certificate of the intended recipient client has been obtained, the transmitting client verifies the signature of the certification authority that signed the certificate. The verification is done using a trusted public key stored within the transmitting client and a verification algorithm, which is included in the Entrust/Client Software. Having verified the signature of the certification authority, the transmitting client trusts the contents of the public key certificate, i.e., trusts that the public key contained in the certificate is that of the recipient client. Having trust in the public key, the transmitting client uses the public key to encrypt a message, signs the message, and subsequently transmits it to the recipient client. As mentioned in the background section, the encrypted message may include a wrapped session key (i.e., a symmetric key encrypted using the public key of the recipient client) and an accompanying encrypted message which is encrypted using the symmetric key.

Upon receiving the encrypted message, the recipient client attempts to verify the signature of the transmitting client. To do this, the recipient client obtains a public key certificate of the transmitting client which is signed by a certification authority. Using the trusted keys its stores locally, the recipient client can authenticate the signature of the certification authority. Once this signature is verified, the recipient client can use the public key of the transmitting party, which is contained in the public key certificate, to verify the signature of the transmitting client. Independent of verifying the signature of the transmitting client, the recipient client utilizes its own private key to decrypt the message (or the wrapped session key to recover the symmetric key).

The certification authorities 34, 46, and 58 provide trusted public keys of various certification authorities to their clients. As mentioned above the affiliation of clients to certification authorities is based on policies of the secure communication system (which are established by the policy authority 14 or certification authorities performing the policy authority function). In addition, the policy also establishes which certification authorities a client can trust and may further include granting privileges to a client, such that the client may add and/or delete trusted certification authority public keys to its local store of trusted keys. The certification authorities may provide the trusted public keys to their clients at various convenient times, such as at initiation of a client (i.e. when the client registers with the system administrator of the locale), when public keys are periodically updated, and/or at time of user key recoveries.

The trusted public keys may be updated when a policy change occurs. The policy change, which is initiated by the system administrator or a certification authority administrator, adds or deletes trusted certification authorities from a client's list. Such changes to the client's list of trusted public keys of trusted certification authorities is done on-line thereby allowing multiple trusted keys to be managed on-line without hard coding of the client's software. Key recovery is initiated by a client when the client has lost its private key(s). To regain its private key(s), the client makes a request of the certification authority, or server, to regain its private key(s). At this time, the certification authority would provide the requesting client with a list of trusted public keys of trusted certification authorities along with its private key(s).

To provide the client with the trusted public keys of trusted certification authorities, the locale certification authorities 34, 46, and 58, or any of the certification authorities that has been designated to provide the trusted keys to clients, provides a certification authority signature public key certificate 76. The signature public key certificate 76 is a self-signed certificate of the certification authority in that the signature of the certification authority 82 is verified using the public key of the same certification authority 80. The identity of the certification authority 78 identifies the particular certification authority that the public key is affiliated with. Note that the public key of the certification authority 80 may be a single public key as illustrated, or be replaced by a plurality of public keys that a client may trust by providing a plurality of self-signed certificates 76 each containing a different public key.

In the secure communication system 10, a client may receive any one of three messages: a client public key certificate 68, the certification authority signature public key certificate 76 (which was discussed in the preceding paragraph) and a security related operation 84. The client public key certificate 68 includes a field for the identity of the subject i.e., client 70, a field for the public key of the client 72, optionally additional fields as required, and a field for the signature of a certification authority 74. Upon receiving this certificate 68, a client utilizes the trusted public keys that it has locally stored to verify the signature of the certification authority stored in field 74. If the signature is verified, the client can reliably utilize the public key information stored in field 72 to encrypt a message or to verify a signature.

The security related operation 84 is a request that the client cryptographic engine receives from a client application (note that both the client cryptographic engine and the client application are software components with the client). The security related operation 84 includes a requested operation 86, which requests the client cryptographic engine to either verify a signature or to encrypt a message. The security related operation 84 further includes a client public key certificate 68, wherein the public key of the client contained in field 72 is the subject public key that the client cryptographic engine uses to verify a signature or to encrypt a message.

As an example of the secured communication system 10, assume that it is a secured communication system for a company. Further assume that locale 16 is for the company's human resources group, locale 18 is for the company's financial resources group, locale 20 is for the company's operations group, and locale 22 is for the company's marketing group. Further assume that the communication network 12 may be the public switching telephone network (PSTN), the Internet, an asynchronous transfer mode (ATM) communication infrastructure, or a wide area network. Still further assume that the company has limited secure communications to be completely within each of the locales.

In other words, only members of a particular group may communicate securely with the same members of that group. In this situation, the system administrator would indicate the restriction to the certification authority which would provide each of the clients only with a trusted key for the local certification authority. Note that for locale 16 (i.e., the human resources group), the local certification authority may be the policy authority 14 or the certification authority 34 of the finance group, and the system administrator may be the system administrator 44 of the operations group.

With this secure communication limitations, a client in one group (i.e., locale) could not securely communicate, in a trusted manner, with a client in another group, with the exception of locale 18 being able to communicate securely with locale 16. For example, if a client in the operations group, i.e., locale 20, desires to securely transmit a message to a client in the marketing group, i.e., location 22, the client at locale 22 could not verify the signature of the client in locale 20. This occurs because the client at locale 22 has only been provided with the trusted public key of their local certification authority 58.

Realizing that the various departments of the company needs to secure communication with each other, the system administrator would change the policy of the company. As such, a new company security policy would allow members of each of the various groups to securely communicate with each other. To achieve this the system administrator, via the policy authority or a designated one of the certification authorities, would instruct the local certification authorities to update the sets of trusted certification authority public keys of their clients. The update, which contains a set of certification authority signature public key certificates 76, would include the public keys of each of the certification authorities. By providing updates in this manner, the entire system may be updated on-line or in a store and forward manner without having to change the hard coded software of each client. Each client in the system would then locally store information such that the three public keys of the certification authorities 58, 46 and 34 are trusted, allowing each user to verify the public key certificates of all other clients in the four locales.

Figure 2:
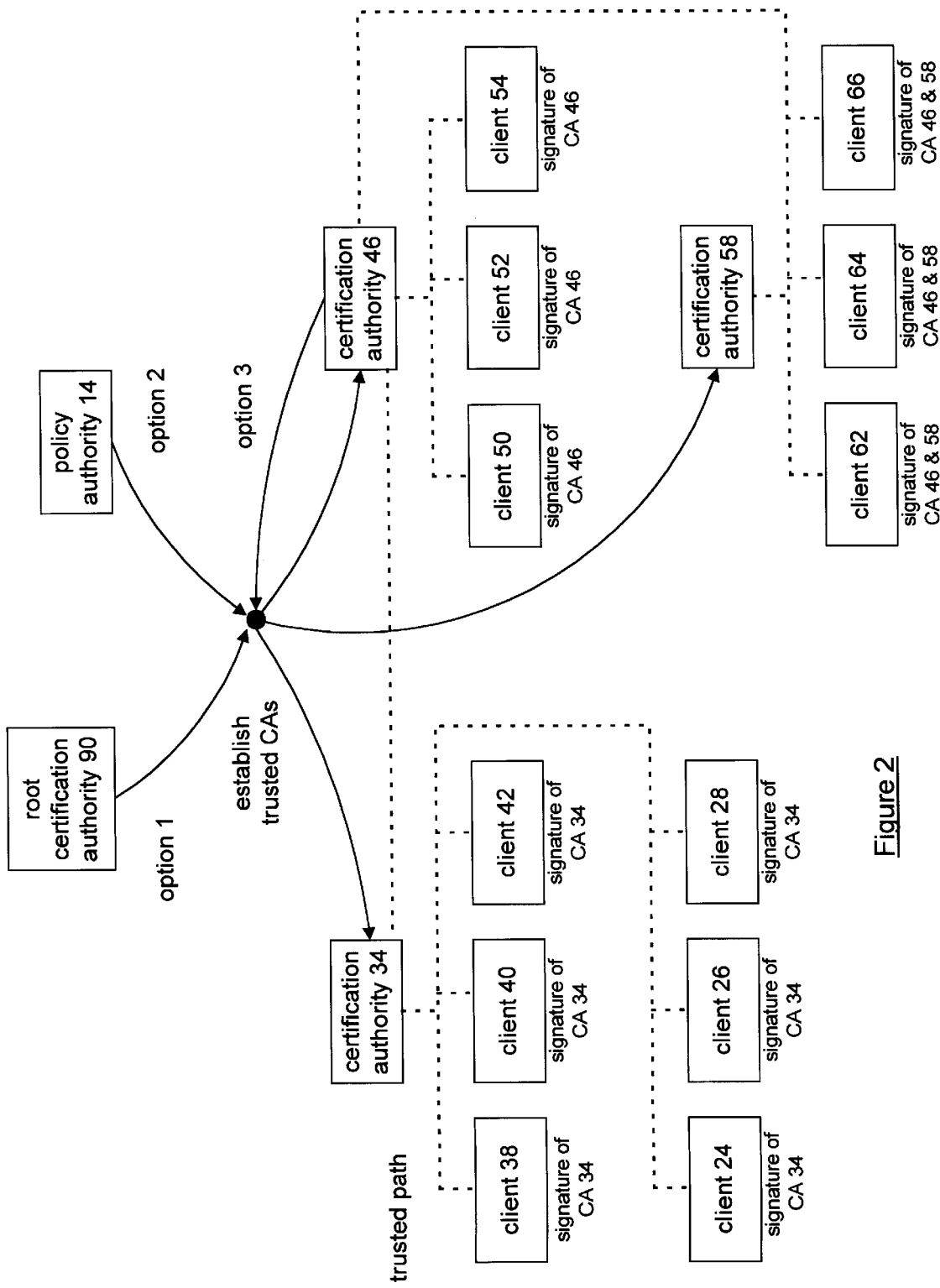
FIG. 2 illustrates a graphical representation of clients and trusted certificate authorities in accordance with the present invention.

FIG. 2 illustrates a graphical representation of trusted paths between clients and certification authorities and how such trusted paths are established. As shown, clients 38–42 and clients 24–28 have a trusted path with certification authority 34. The trusted path is verifiable in that each of the clients stores a trustworthy copy of the signature public key of the certification authority 34. Thus, any certificate received by these clients 24–28 and 38–42 wherein the certificate is signed by certification authority 34 can be trusted by these clients. The certification authority 34 has a trusted path established (as explained below) with certification authority 46. As such, when one of the clients 24–28 and 38–42 receives a signed message from one of the clients 50–54 associated with certification authority 46, the clients 24–28 and 38–42 can indirectly verify the signed message.

To indirectly verify the signed message, the recipient client 24–28, 38–42 acquires a signature public key certificate of the transmitting client 50–54. The signature public key certificate includes the signature public key of the transmitting client and a signature of the certification authority 46. The recipient client, however, only has stored the signature public key of the certification authority 34. As such, the recipient client cannot directly verify the signature on the signed message. The recipient client must further request a signature public key certificate of the certification authority 46 signed by the certification authority 34. This certificate establishes the trusted path relationship between the two certification authorities 34 and 46. From this certificate, the recipient client can verify the signature public key of certification authority 46 and then use this public key to verify the signature of the transmitting party. This set of two or more certificates is called a certificate chain. To provide an alternative which avoids use of this nested structure (certificate chain), clients 24–28 and 38–42 may have their set of trusted certification authority public keys updated, on-line, to include the signature public key of the certification authority 46 in addition to including that of their own certification authority 34.

Clients 50–54 store, in persistent local memory (e.g. stored software file or hardware token such as a PCMCIA card or smart card) associated with a client cryptographic engine (discussed with reference to FIG. 3), the trusted signature public key of certification authority 46 such that any certificates that they received which have the signature of certification authority 46 can be trusted. Similarly, client 62–66 include the signature public keys of certification authority 46 and 58. As such, any certificates signed by either of the certification authorities can be directly trusted by these particular clients.

In order for the clients to trust the appropriate signature public keys of the certification authorities, the clients must be provided with this information in a trustworthy manner. One such trustworthy manner is to have a root certification authority 90 establish the trusted certification authorities by providing the information, optionally including the self-signed public-key certificate of the root certification authority itself, to the local certification authorities 34, 46 and 58, such that the local certification authorities can provide an initial set of trusted certification authority public keys to their respective clients. Alternatively, the root certification authority 90 may directly provide the signature public keys of the certification authorities to the clients.

The second option is to have the policy authority 14 establish the policy as to which certification authorities clients can trust. Having established the policy, the policy authority 14 provides it to the local certification authorities 34, 46, and 58 whereby the local certification authorities provide the appropriate trusted public keys to their respective clients. Alternatively, the policy authority 14 may directly provide the trusted public key information of the certification authorities to the client. As yet another option, one of the certification authorities may be designated as a policy authority wherein it informs the local certification authorities as to which trusted public keys of the certification authorities the various clients will have. Regardless of which option is employed, the clients are provided, in a trustworthy manner, the signature public keys of the certification authorities that they may trust in an on-line fashion. When done in this manner, the clients' software does not to be hard-coded, and consequently the trusted certification authority public keys may be readily updated.

Figure 3:
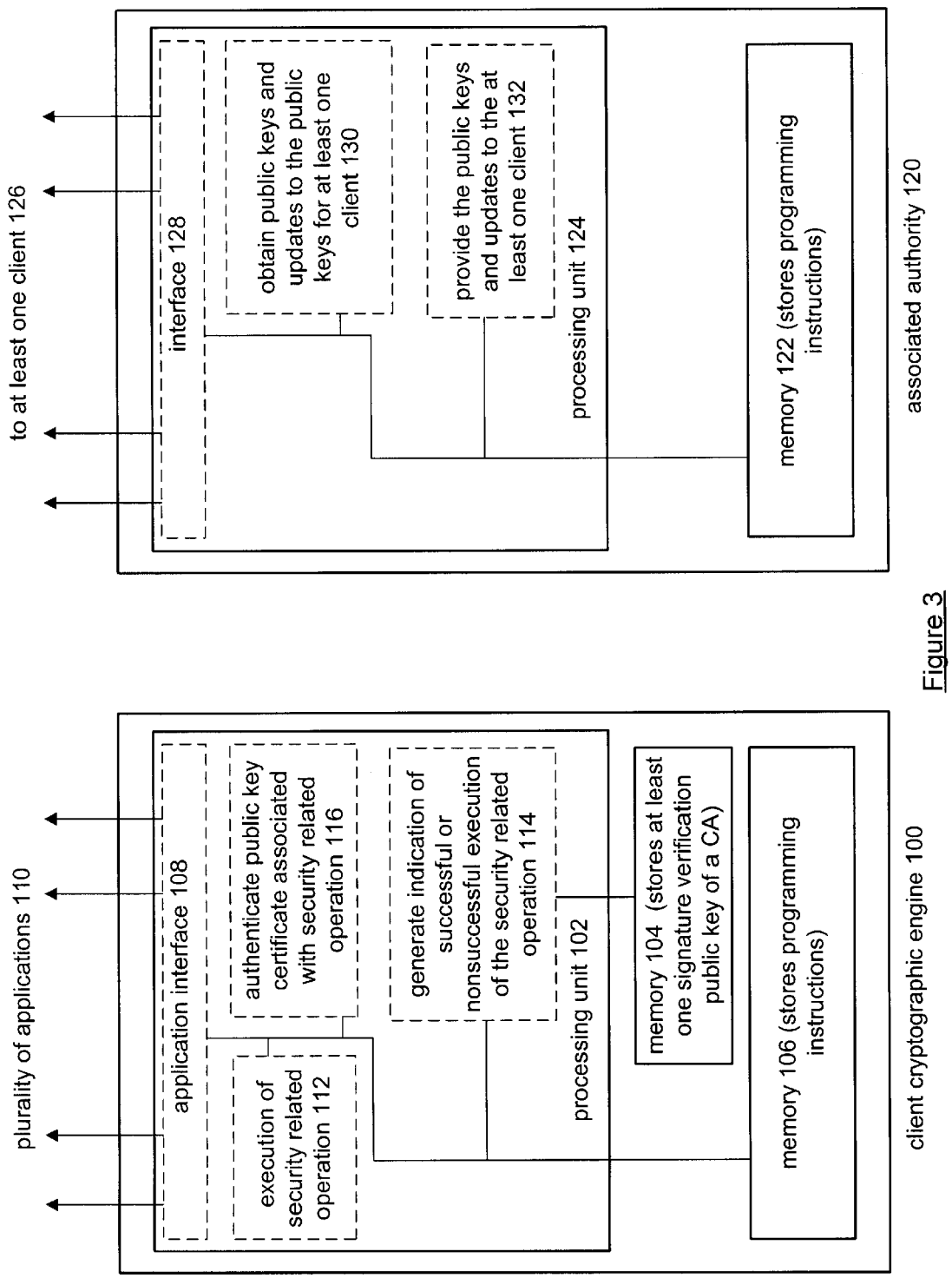
FIG. 3 illustrates a schematic block diagram of a client cryptographic engine and an associated authority in accordance with the present invention.

FIG. 3 illustrates a schematic block diagram of a client cryptographic engine 100 which is included in any of the clients' 24–28, 38–42, 50–54, and 62–66. In addition, FIG. 3 illustrates an associated authority 120 which may be any of the certification authorities 34, 46, and 58, or the policy authority 14, and which is controlled by any of the system administrators 30, 32, 44 and 56. The client cryptographic engine 100 is shown to include a processing unit 102, memory 104, which stores at least one signature verification public key of a certification authority, and memory 106 which stores programming instructions. The programming instructions stored in memories 106, when read by the processing unit 102, causes the processing unit to authenticate a public key certificate associated with this security-related operation 116, execute a security-related operation 112, and generate an indication of the successful or non-successful execution of the security-related operation 114. A detailed discussion of the execution of security-related operation 112 the generation of the indication 114, and the authentication of the public key certificate 116 will be discussed in greater detail with reference to FIG. 6.

In addition, the programming instructions cause the processing unit 112 to function as an application program interface 108. The application interface 108 allows the client cryptographic engine 100 to interface with a plurality of client applications 110. The plurality of client applications may be file encryption applications, word-processing applications, electronic forms applications, HTML document processing software, e-mail applications, or any other applications that run on a personal computer. Each client application includes invocations of the interface points of the corresponding application program interface such that each client application may use the same public key certificate infrastructure implemented by the client engine.

The associated authority 120 includes a processing unit 124 and memory 120 which stores programming instructions. The processing unit, when reading the programming instructions from memory 122 obtains trusted certification authority public keys and updates the public keys for at least one client 130 and provides the public keys and updates to the at least one client 132. The providing and obtaining is done through interface 128 which allows the processing unit to interface with the at least one client 126. In addition, the interface allows the associated authority to interface with the policy authority, and/or a system administrator. A more detailed discussion of the operations of the associated authority will be provided with reference to FIG. 5.

Note that the processing units 102 and 124 each may be a microprocessor, a microcomputer, a central processing unit, a digital signal processor, a micro-controller, microcomputer or any other processing device that manipulates digital information based on programming instructions. Further note that memory 104, 106 and 122 each may be random access memory, cache memory, read-only memory, electronically programmable read-only memory, CD ROM, DVD ROM, floppy disk, or any other device that stores digital information.

Figure 4:
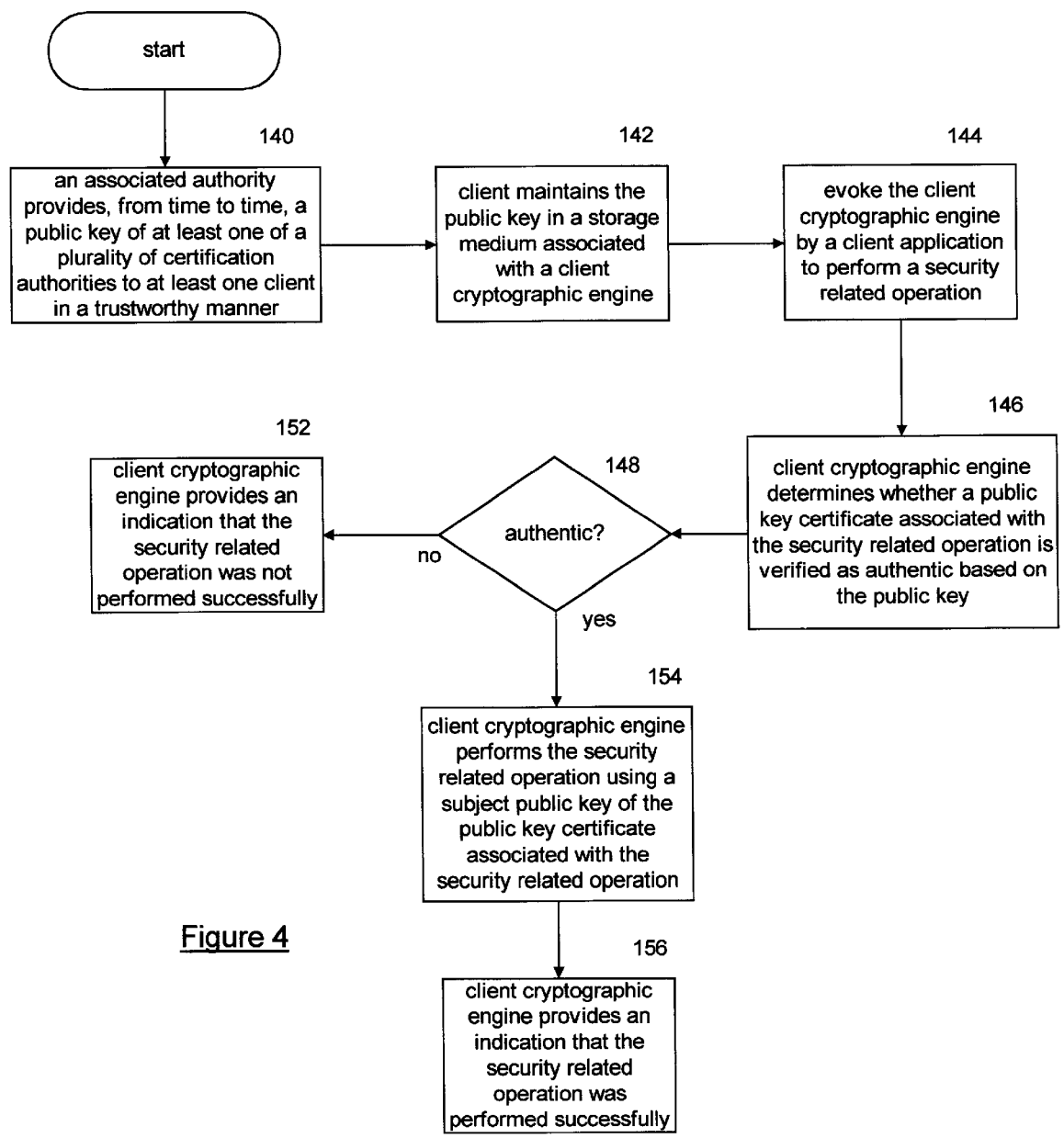
FIG. 4 illustrates a logic diagram that may be used to provide public key management in accordance with the present invention.

FIG. 4 illustrates a logic diagram that may be used to provide public key management. The process begins at step 140 where an associated authority provides, from time to time, a public key of at least one of a plurality of certification authorities to at least one client in a trustworthy manner. This may be done at initialization of the client software, i.e., when the client software registers with the system, when a client's own public/private key pairs are updated, at public key updating of the at least one of the plurality of certification authorities, i.e., when the policy changes the trusted public keys of a client, and/or at client key recovery. As previously mentioned, key recovery occurs when a client has lost its private key and has requested to recover it from the associated authority. Note that the associated authority may be any one of the certification authorities or the policy authority.

The associated authority may provide the public key to the client either via an on-line communication path or a store and forward communication path. The on-line communication path is a real time transmission of the data while a store and forward communication path, as the name implies, stores the data and then subsequently forwards it in non-real time to the recipient client. Note that the associated authority may provide the client with a set of public keys wherein the set corresponds to a set of trusted certification authorities. When the client is provided with a set of public keys, any one of the certification authorities may provide the signature to a certificate received by the client or the first certificate in a certificate chain, and the client, via the trusted public keys, can trust the authenticity of the public key with the first certificate and indirectly, subsequent certificates in a certificate chain if present.

The process proceeds to step 142 where the client maintains the public key or public keys in a storage medium associated with a client cryptographic engine (Refer to FIG. 3 for a physical description of the storage medium and the client cryptographic engine). The process then proceeds to step 144 where the client cryptographic engine is evoked by a client application to perform a security-related operation. In essence, the security-related operation is requesting the client cryptographic engine to either verify the authenticity of a signature of a received certificate or to retrieve a subject's encryption or signature public key. In the retrieval of a subject's public key, which can be done either from a directory or local memory, the encryption public key certificate is signed by a certification authority. The client cryptographic engine, using its trusted certification authority public keys, attempts to verify the certification authority signature on the public key certificate in question.

The process then proceeds to step 146 where the client cryptographic engine determines whether a public key certificate associated with the security-related operation is verified as authentic based on the corresponding signature verification public key. As discussed with reference to step 144, the verification is done by authenticating the signature of the certification authority that signed the public key certificate.

The process then proceeds to step 148 where a determination is made as to whether the public key certificate was authentic. If not, the process proceeds to step 152 where the client cryptographic engine provides an indication to the client application that the security-related operation was not performed successfully. If, however, the public key certificate was authenticated, the process proceeds to step 154. At step 154, the client cryptographic engine performs the security-related operation using a subject public key of the public key certificate associated with the security-related operation. Having done this, the process proceeds to step 156 where the client cryptographic engine provides an indication that the security-related operation was performed successfully.

Figure 5:
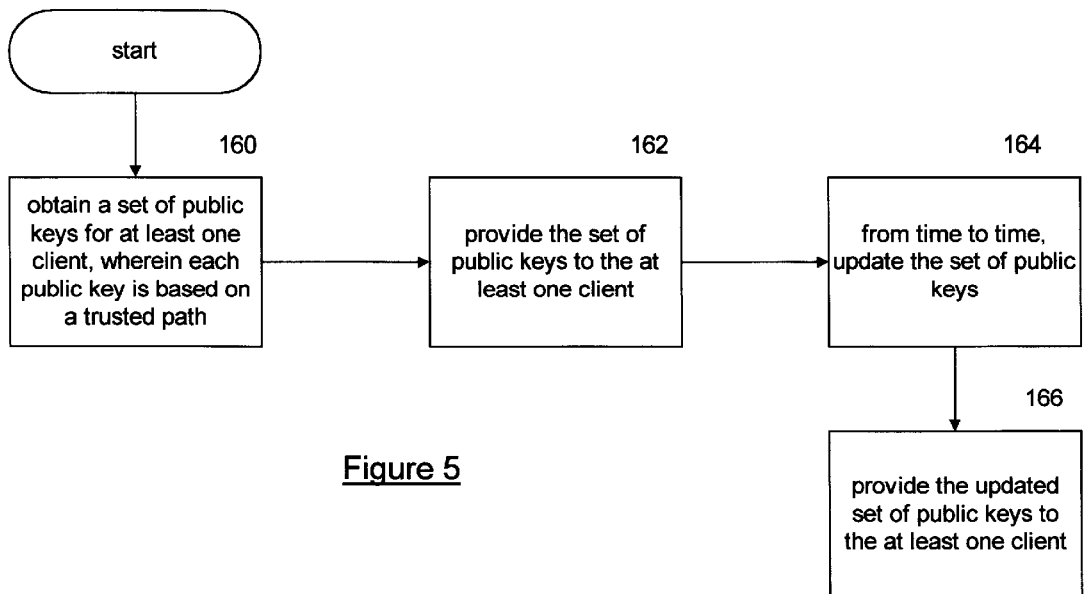
FIG. 5 illustrates a logic diagram for an associated authority to facilitate public key management in accordance with the present invention.

FIG. 5 illustrates a logic diagram that may be used by an associated authority to facilitate public key management. The process begins at step 160 where the associated authority obtains a set of trusted certification authority public keys for at least one client. Each of the public keys is based on a trusted path (as depicted and discussed with reference to FIG. 2). Note that the associated authority may provide the set of public keys to a group of clients and may further provide different sets of public keys to different groups of clients. Further note that the set of public keys may be obtained from a system administrator, a policy authority, a designated certification authority or local memory of the particular associated authority. Further note that the associated authority may be the local certification authority of the client, i.e., the certification authority that issued the public key certificate to the client, the policy authority, or any one of the certification authorities that has been designated as the initialization authority for the particular client.

The process proceeds to step 162 where the associated authority provides the set of public keys to the at least one client. Each of the public keys may be distributed as a self-signed certificate that includes identity of the associated authority, the public key of the associated authority and the signature of the associated authority. The self-signed certificate was depicted in FIG. 1 as the signature public key certificate 76. The process then proceeds to step 164 where, from time to time, the set of public keys are updated for this particular client. The public keys may be updated based on a policy change, a client request for key recovery, or at initialization of a client or a new certification authority. Once the keys are updated, the process proceeds to step 166 where the updated keys are provided to the at least one client.

Figure 6:
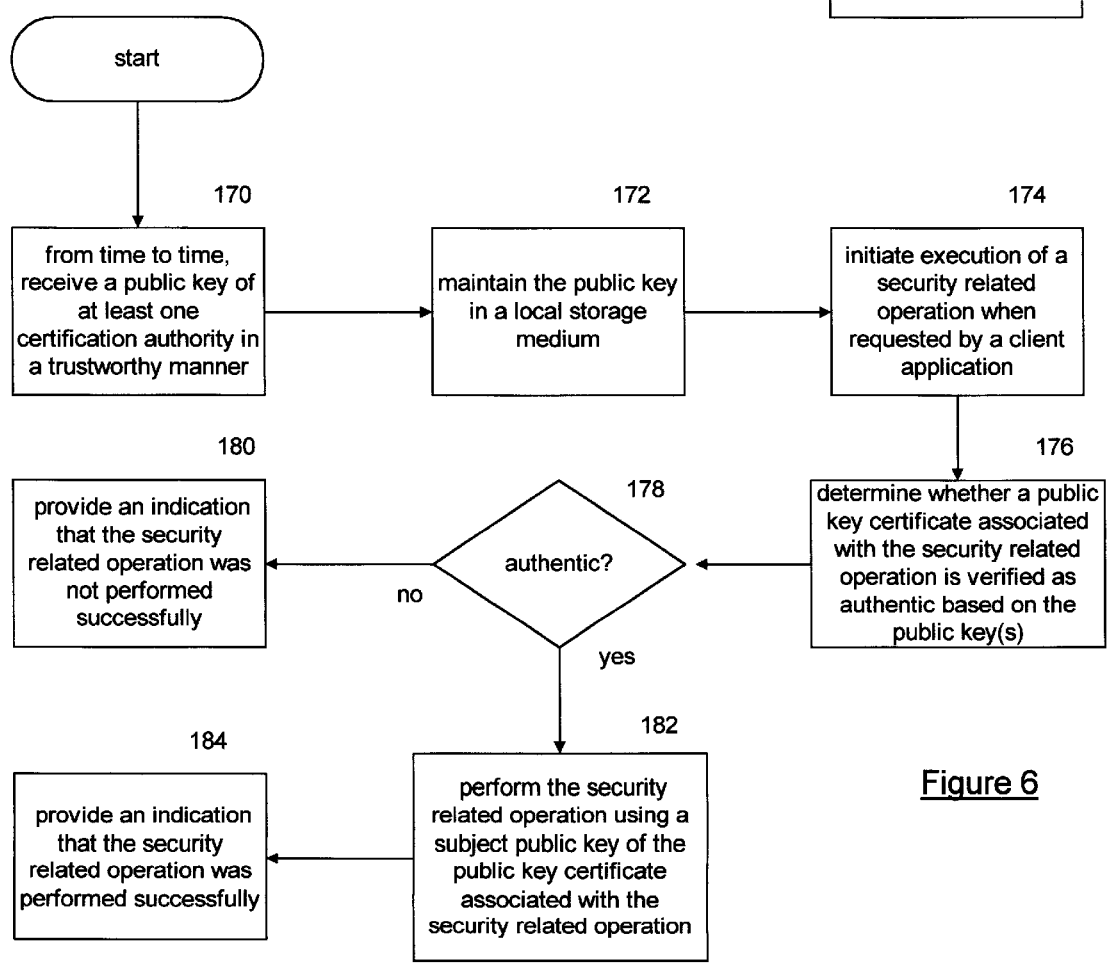
FIG. 6 illustrates a logic diagram for a client cryptographic engine to facilitate public key management in accordance with the present invention.

FIG. 6 illustrates a logic diagram that may be used by a client cryptographic engine to facilitate public key management. The process begins at step 170 where, from time to time, the client cryptographic engine receives a public key of at least one certification authority in a trustworthy manner. The trustworthy manner was previously discussed with reference to FIGS. 1 and 2. The process then proceeds to step 172 where the client cryptographic engine maintains the public key(s) in a trusted local storage medium. Refer to FIG. 3 for a description of the local storage medium 104.

The process continues at step 174 where the client cryptographic engine initiates execution of a security-related operation when requested by a client application. The process proceeds to step 176 where the client cryptographic engine determines whether a public key certificate associated with the security-related operation is verified as authentic based on the set of trusted public keys. This may be done indirectly by verifying the public key certificate associated with the security operation where the public key certificate includes a signature of another one of the plurality of certification authorities. The indirect verification of the public key certificate is done by authenticating a certification authority chain between at least one of the plurality of certification authorities and another one of a plurality of certification authorities. Thus, the client cryptographic engine may verify the public key of another one of the certification authorities even though it is not stored in memory by utilizing a certification chain between the certification authority and a trusted certification authority.

The process proceeds to step 178 where a determination is made as to whether the public key certificate was authenticated. If not, the process proceeds to step 180 where the client cryptographic engine provides an indication that the security-related operation was not performed successfully. If, however, the public key certificate was authenticated, the process proceeds to step 182 where the client cryptographic engine performs the security-related operation. Such performance is done utilizing a subject public key of the public key certificate associated with the security-related operation.

The security related operation may be a request to verify the authenticity of a client public key certificate, by verifying the signature of the certification authority directly when client cryptographic engine has a trusted public key for the certification authority. Alternatively, the security-related operation may be a request to verify the authenticity of a public key indirectly via a certification authority chain when the client cryptographic engine does not have a trusted key for the certification authority, but the certification authority has established a trusted path with a trusted certification authority, i.e., a certification authority for which the client cryptographic engine has a trusted public key. Yet another alternative is for the security-related operation to be to verify the signature of a client on a by verifying the authenticity of a public key as above and then using this public key to verify the client signature on a message.

As another alternative, the security-related operation may be a request to encrypt an outgoing message. To encrypt an outgoing message, the client cryptographic engine communicates with a directory to obtain a public key certificate of a recipient client. Upon receiving the public key certificate of the recipient client, the client cryptographic engine authenticates the certification authority signature of the certificate. The signature is authenticated via one of the stored certification authority public keys. The client cryptographic engine then provides the public key to a client application. As an alternative to communicating with a directory, the client cryptographic engine may have locally stored the public key certificate of the recipient client. If authenticated, the client cryptographic engine provides the subject public key to the client application. The process then proceeds to step 184 where the client cryptographic engine provides an indication that a security-related operation was performed successfully. This may be done by providing the subject's public key to the client application.

The preceding discussion has presented a method and apparatus for public key management. Such a method and apparatus allows on-line real-time updating of trusted public keys of trusted certification authorities by communication between client-end cryptographic engines and system-controlled server software (such as certification authorities). This is done in a trustworthy manner and keeps the control at the system administrator's level as opposed to the client level, allowing the trust system to reflect the security policy of an organization as set by a policy authority or a system administrator. The present method and apparatus further eliminates the need for hard-coding or pre-configuring of trusted public keys into the clients' software, thereby making the secure communication system more flexible to meet clients' demands. This also eliminates the need for the end-users who run client software, and who generally cannot be expected to understand security implications of trusting various public keys, to be involved in decisions as to which public keys to trust.

What is claimed is:

1. A method for public key management, the method comprises the steps of:
   a) from time to time, providing, in a trustworthy manner by an associated authority, a list of at least a plurality of trusted public keys of a plurality of different trusted certification authorities to at least one client, wherein at least one of the plurality of trusted certification authorities is not associated with a locale that the at least one client is associated with and wherein a certificate chain is not necessary to trust the plurality of trusted public keys on the list; and providing trusted public keys via an on-line communication path or a stored and forward communication path;
   b) by maintaining, by the at least one client, the trusted public keys of the trusted certification authorities in a storage medium associated with a client cryptographic engine;
   c) evoking the client cryptographic engine by a client application to perform a security related operation;
   d) determining, by the client cryptographic engine, whether a public key certificate associated with the security related operation is verified as authentic based on the trusted public keys of the trusted certification authorities;
   e) when the public key certificate associated with the security related operation was verified as authentic, performing the security related operation using a subject public key of the public key certificate associated with the security related operation;
   f) providing, by the client cryptographic engine to the client application, an indication that the security operation was performed successfully; and
   g) when the public key certificate associated with the security related operation was not verified as authentic, providing, by the client cryptographic engine to the client application, an indication that the security operation was not performed successfully.

2. The method of claim 1 further comprises, within step (a), providing the trusted public keys of the trusted certification authorities to the at least one client at least one of: initialization of the at least one client, public key set updating of the at least one of the plurality of certification authorities by the associated authority, and key recovery.

3. The method of claim 1 further comprises, within step (c), evoking the client cryptographic engine in response to receiving, by the at least one client, a message from another client, wherein the message is signed by the another client and the public key certificate of the another client is signed by a certification authority of the plurality of certification authorities, within step (d) indirectly verifying the public key certificate by authenticating a certification authority chain between the at least one of the plurality of certification authorities and the another one of the plurality of certification authorities.

4. The method of claim 1 further comprises, within step (a), providing a set of public keys of a set of the plurality of certification authorities to the client cryptographic engine.

5. A method for an associated authority to facilitate public key management, the method comprises the steps of:
   a) obtaining a set of public keys of different trusted associated authorities for at least one client, wherein each public key of the set of public keys is based on a separate trusted path between the at least one client and one of the different trusted associated authorities, wherein at least one of the different trusted associated authorities is not associated with a locale that the at least one client is associated with and wherein a certificate chain is not necessary to trust the plurality of trusted public keys on the list;

b) providing the set of public keys to the at least one client in a trustworthy manner;

c) from time to time, updating the set of public keys to produce an updated set of public keys; and d) providing the updated set of public keys to the at least one client.

6. The method of claim 5 further comprises providing the set of public keys to a group of clients.

7. The method of claim 6 further comprises providing a second set of public keys to a second group of clients.

8. The method of claim 5 further comprises obtaining the set of public keys from at least one of: a system administrator, a policy authority, a designated certification authority, and local memory.

9. The method of claim 5 further comprises, within step (b), providing the set of public keys by way of a set of self signed certificates, wherein each of the self signed certificates include identity of the associated authority, the public key of the associated authority, and signature of the associated authority.

10. The method of claim 5 further comprises, within step (b), providing, as the associated authority, the set of public keys to the at least one client by at least one of: a certification authority of the plurality of certification authorities that issued a public key certificate of the at least one client to the at least one client, a policy authority, and any one of the plurality of certification authorities.

11. An associated authority comprises:

a processing unit; and memory that is operably coupled to the processing unit, wherein the memory stores programming instructions that, when read by the processing unit, causes the processing unit to (a) obtain a set of public keys of trusted associated authorities for at least one client, wherein each public key of the set of public keys is based on a separate trusted path between the at least one client and one of a set of different certification authorities; wherein at least one of the different trusted associated authorities is not associated with a locale that the at least one client is associated with and wherein a certificate chain is not necessary to trust the plurality of trusted public keys on the list; (b) provide the set of public keys to the at least one client in a trustworthy manner; (c) from time to time, update the set of public keys to produce an updated set of public keys; and (d) provide the updated set of public keys to the at least one client.

12. The associated authority of claim 11 further comprises, within the memory, programming instructions that, when read by the processing unit, causes the processing unit to update the set of public keys at least one of: initialization of the at least one client, key recovery, and when the set of public keys is changed by a system administrator.

13. The associated authority of claim 11 further comprises, within the memory, programming instructions that, when read by the processing unit, causes the processing unit to provide, as the associated authority, the set of public keys to the at least one client by at least one of: a certification authority of the plurality of certification authorities that issued a public key certificate of the at least one client to the at least one client, a policy authority, and any one of the plurality of certification authorities.

14. The associated authority of claim 11 further comprises, within the memory, programming instructions that, when read by the processing unit, causes the processing unit to provide the set of public keys by way of a set of self signed certificates, wherein each of the self signed certificates includes identity of the associated authority, the public key of the associated authority, and signature of the associated authority.

15. A digital storage medium that stores programming instructions that, when read by a processing unit, causes the processing unit to function as a client cryptographic engine, the digital storage medium comprises:

first means for storing programming instructions that, when read by the processing unit, causes the processing unit to obtain a set of public keys of trusted associated authorities for at least one client, wherein each public key of the set of public keys is based on a separate trusted path between the at least one client and one of a set of different certification authorities, wherein at least one of the different trusted associated authorities is not associated with a locale that the at least one client is associated with and wherein a certificate chain is not necessary to trust the plurality of trusted public keys on the list;

second means for storing programming instructions that, when read by the processing unit, causes the processing unit to provide the set of public keys to the at least one client in a trustworthy manner;

third means for storing programming instructions that, when read by the processing unit, causes the processing unit to, from time to time, update the set of public keys to produce an updated set of public keys; and fourth means for storing programming instructions that, when read by the processing unit, causes the processing unit to provide the updated set of public keys to the at least one client.

16. The digital storage medium of claim 15 further comprises, within the fifth means, programming instructions that when read by the processing unit, causes the processing unit to update the set of public keys at least one of: initialization of the at least one client, key recovery, and when the set of public keys is changed by a system administrator.

17. The digital storage medium of claim 15 further comprises, within the fifth means, programming instructions that when read by the processing unit, causes the processing unit to providing, as the associated authority, the set of public keys to the at least one client by at least one of: a certification authority of the plurality of certification authorities that issued a public key certificate of the at least one client to the at least one client, a policy authority, and any one of the plurality of certification authority.

18. The digital storage medium of claim 15 further comprises, within the fifth means, programming instructions that when read by the processing unit, causes the processing unit to provide the set of public keys by way of a set of self signed certificates, wherein each of the self signed certificates includes identity of the associated authority, the public key of the associated authority, and signature of the associated authority.

19. A method for a client cryptographic engine to facilitate public keys management, the method comprises the steps of:

a) from time to time receiving, via a trustworthy manner, a list of trusted public keys of trusted certification authorities of a plurality of different certification authorities, wherein at least one of the different trusted certification authorities is not associated with a locale that the client cryptographic engine is associated with and wherein a certificate chain is not necessary to trust the plurality of trusted public keys on the list;

b) maintaining the trusted public keys of the trusted certification authorities in a local storage medium;

c) initiating execution of a security related operation when requested by a client application, wherein the client application interfaces with the client cryptographic engine via an application program interface;

d) as part of the initiating execution, determining whether a public key certificate associated with the security related operation is verified as authentic based on the trusted keys of the trusted certification authorities;

e) when the public key certificate associated with the security related operation was verified as authentic, performing the security related operation using a subject public key of the public key certificate associated with the security related operation;

f) providing an indication that the security operation was performed successfully to the client application; and g) when the public key certificate associated with the security related operation was not verified as authentic, providing an indication that the security operation was not performed successfully to the client application.

20. The method of claim 19 further comprises, within step (f), providing, as the indication, the subject public key of the public key certificate.

21. The method of claim 19 further comprises, within step (d), determining that the public key indirectly verifies the public key certificate associated with the security operation, wherein the public key certificate includes a signature of another one of the plurality of certification authorities.

22. The method of claim 21 further comprises indirectly verifying the public key certificate by authenticating a certification authority chain between the at least one of the plurality of certification authorities and the another one of the plurality of certification authorities.

23. The method of claim 19 further comprises, within step (e), performing the security related operation to verify the signature of a received message directly when the certification authority is the at least one of the plurality of certification authorities, and verifying the signature of the received message indirectly via a certification authority chain when the certification authority is another one of the plurality of certification authorities.

24. The method of claim 19 further comprises, within step (e), performing the security related operation to encrypt an outgoing message.

25. The method of claim 24 further comprises, to encrypt the outgoing message, communicating, by the client cryptographic engine, with a directory to obtain a public key certificate of a recipient client of the outgoing message and authenticating a certification authority's signature of the public key certificate of the recipient client.

26. The method of claim 24 further comprises, to encrypt the outgoing message, retrieving, by the client cryptographic engine from local memory, a public key certificate of a recipient client of the outgoing message and authenticating a certification authority's signature of the public key certificate of the recipient client.

27. A client cryptographic engine comprising:

first memory means for storing programming instructions that, when read by a processor, causes the processor to interface with at least one application;

second memory means for storing trusted public keys of trusted certification authorities of a plurality of certification authorities, wherein the at least one public key of the trusted public keys is a signature verification public key of one of a plurality of different certification authorities, wherein at least one of the trusted certification authorities is not associated with a locale that the client cryptographic engine is associated with and wherein a certificate chain is not necessary to trust the plurality of trusted public keys on the list;

a processing unit; and third memory means for storing programming instructions that, when read by the processing unit, causes the processing unit to (I) initiate execution of a security related operation when requested by the at least one application; (ii) as part of the initiating execution, determine whether a public key certificate associated with the security related operation is verified as authentic based on the trusted public keys of the trusted certification authorities; (iii) perform the security related operation when the public key certificate associated with the security related operation was verified as authentic; (iv) provide, to the at least one application, an indication that the security related operation was performed successfully and (v) provide, to the at least one application, an indication that the security related operation was not performed successfully when the public key certificate associated with the security related operation was not verified as authentic.

28. The client cryptographic engine of claim 27 further comprises, within the first memory means, programming instructions that, when read by the processing unit, causes the processing unit to interface with a plurality of applications, wherein any of the plurality of applications can request of the security related operation.

29. The client cryptographic engine of claim 27 further comprises, within the third memory means, programming instructions that when read by the processing unit, causes the processing unit to update the trusted public keys of the trusted certification authorities, wherein updates are received from an associated authority.

30. The client cryptographic engine of claim 27 further comprises, within the third memory means, programming instructions that when read by the processing unit, causes the processing unit to determine that at least one of the trusted public keys indirectly verifies the public key certificate associated with the security related operation, wherein the public key certificate includes a signature of another certification authority.

31. The client cryptographic engine of claim 27 further comprises, within the third memory means, programming instructions that when read by the processing unit, causes the processing unit to perform the security related operation as at least one of: verifying signature of the certification authority on the public-key certificate directly when the certification authority is the at least one of the plurality of certification authorities, and verifying the signature of the certification authority on the public-key certificate indirectly via a certification authority chain when the certification authority is another one of the plurality of certification authorities.

32. The client cryptographic engine of claim 27 further comprises, within the third memory means, programming instructions that when read by the processing unit, causes the processing unit to perform the security related operation to encrypt an outgoing message.

33. A digital storage medium that stores programming instructions that, when read by a processing unit, causes the processing unit to function as a client cryptographic engine, the digital storage medium comprises:

first means for storing programming instructions that, when read by the processing unit, causes the processing unit to, from time to time, receive, via a trustworthy manner, a list of trusted public keys of trusted certification authorities of a plurality of different certification authorities, wherein at least one of the different trusted certification authorities is not associated with a locale that the at least one client is associated with and wherein a certificate chain is not necessary to trust the plurality of trusted public keys on the list;

second means for storing programming instructions that, when read by the processing unit, causes the processing unit to maintain the trusted public keys in a local storage medium;

third means for storing programming instructions that, when read by the processing unit, causes the processing unit to initiate execution of a security related operation when requested by a client application, wherein the client application includes an application program interface to the client cryptographic engine;

fourth means for storing programming instructions that, when read by the processing unit, causes the processing unit to, as part of the initiating execution, determine whether a public key certificate associated with the security related operation is verified as authentic based on the trusted public keys;

fifth means for storing programming instructions that, when read by the processing unit, causes the processing unit to perform the security related operation using a subject public key of the public key certificate associated with the security related operation when the public key certificate associated with the security related operation was verified as authentic;

sixth means for storing programming instructions that, when read by the processing unit, causes the processing unit to provide an indication that the security operation was performed successfully to the client application; and seventh means for storing programming instructions that, when read by the processing unit, causes the processing unit to provide an indication that the security operation was not performed successfully to the client application when the public key certificate associated with the security related operation was not verified as authentic.

34. The digital storage medium of claim 33 further comprises eighth means for storing programming instructions that when read by the processing unit, causes the processing unit to interface with a plurality of applications, wherein any of the plurality of applications can request of the security related operation.

35. The digital storage medium of claim 33 further comprises eighth means for storing programming instructions that when read by the processing unit, causes the processing unit to update the trusted public keys, wherein updates to the trusted public keys are received from an associated authority.

36. The digital storage medium of claim 33 further comprises, within the fifth means, programming instructions that when read by the processing unit, causes the processing unit to perform the security related operation as at least one of: verifying signature of the certification authority on the public-key certificate directly when the certification authority is one of the trusted certification authorities, and verifying the signature of the certification authority on the public-key certificate indirectly via a certification authority chain when the certification authority is another one of the plurality of certification authorities.

37. The digital storage medium of claim 33 further comprises, within the fifth means, programming instructions that when read by the processing unit, causes the processing unit to perform the security related operation to encrypt an outgoing message.

* * * * *